Patented May 16, 1944

2,348,788

UNITED STATES PATENT OFFICE 2,348,788

ALCOHOL-SOLUBLE AZO DYESTUFFS AND THEIR MANUFACTURE

Achille Conzetti, Basel, and Ernst Lehmann, Riehen, near Basel, Switzerland, assignors to J. R. Geigy A. G., Basel, Switzerland, a Swiss firm No Drawing. Application April 21, 1942, Serial No. 439,922. In Switzerland January 21, 1941

12 Claims. (Cl. 260—144)

It has been found that new valuable, alcohol-soluble dyestuff salts are obtained by precipitating azo dyestuffs, more particularly azo dyestuffs of the benzene, naphthalene and pyrazolone series, which contain water solubilising acid groups and at least one hydroxy group acylated by an aryl sulfonic acid, with basic dyestuffs from the series of the yellow to red dyestuffs. The new water-insoluble compounds are distinguished from similar known dyestuff salts obtained from acid and basic dyestuffs by an improved solubility in alcohol, by a better fastness to light and generally by purer shades. Also when compared with improved dyestuff salts which contain complex metal compounds and thus cannot directly be compared therewith, the compounds prepared according to the present invention have been proved superior with respect to solubility, to purer shades and in some cases also to light fastness.

It has furthermore been found that by using azo dyestuffs containing several sulfonic acid groups and requiring therefore more than molecular quantities of basic dyestuff for causing precipitation, a part of the basic dyestuffs may be replaced by other organic bases which are also suitable for the precipitation of acid dyestuffs.

In connection therewith it is advantageous to use at least molecular quantities of basic and acid dyestuffs whereby a sulfonic acid group of the azo dyestuff is connected with the basic dyestuff; the remaining sulfonic acid groups are re-acted with the other organic bases known for the precipitation of acid dyestuffs.

As organic bases, those of the aromatic series such as aniline, toluidines, xylidines, aminodiphenyl compounds, their substitution products, aryl guanidines, aryl biguanides and so on, are primarily useful. An extensive enumeration is superfluous, as a great number of such compounds has become known for the same purposes in the literature, especially in the patent literature.

Owing to the diminution of the basic dyestuff component the shade of these alcohol-soluble dyestuffs approaches rather that of the acid component. The properties, especially the fastness properties are just as good as those of the compounds consisting only of basic and acid dyestuffs.

The present invention is illustrated by the following examples, without being limited thereto. The parts are by weight, unless otherwise stated.

*Example 1*

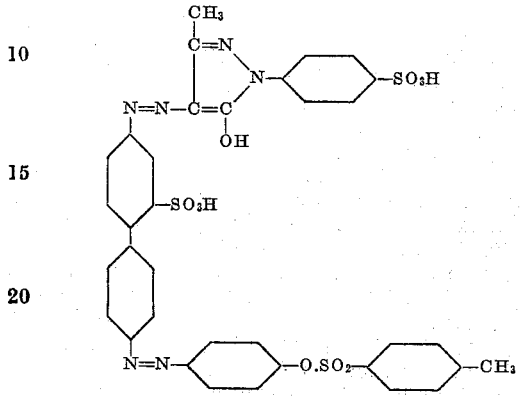

50 parts of this dyestuff are dissolved hot in 2500 parts of water, then the solution is filtered, if necessary, and precipitated at 60°–70° C. with a solution of 72 parts of rhodamine 6G extra (Schultz, Farbstofftabellen, 7. Auflage, No. 866) in 1880 parts of water and 36 parts of acetic acid 80%. When the precipitation has completed, stirring is continued for an additional 15 minutes and the whole is filtered.

The new yellow-brown, crystalline compound dissolves, already in the cold, in alcohol in a quantity of 10% and more and dyes cellulose ester lacquers with a pure orange coloration of a very good light fastness.

When the acid dyestuff is precipitated out by means of rhodamine B (Schultz No. 864), a crystallised, brown powder is obtained, the solubility of which is remarkable already in the cold. Also other rhodamine dyestuffs of the trade, such as for example rhodamine G, 3B or 3G are also suitable.

The dyeings in cellulose ester lacquers are distinguished, besides a good light fastness, by an extremely high purity and brilliancy.

Example 2

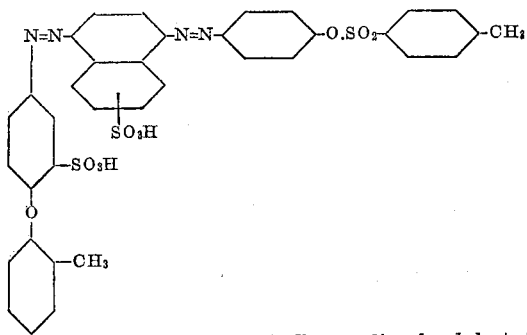

50 parts of this dyestuff are dissolved hot in 2500 parts of water and precipitated at 55°–60° C. with a solution of 87.5 parts of rhodamine 6G extra in 2000 parts of water and 45 parts of acetic acid 80%. The whole is heated up to 75° C., whereby the new compound separates out in a crystallised form of a brown aspect. It produces coatings of a pure orange coloration and red colorations of excellent light fastness. When compared with a similar compound obtainable from chrysophenine (Schultz No. 726) and rhodamine B, the precipitation prepared according to the above example is by far faster to light, purer with respect to the coloration and much better soluble in alcohol. The chrysophenine lacquer is difficultly soluble in alcohol; also in other usual solvents and cellulose ester lacquers large residues remain so that a practical use does not come into question. From this comparison it results that the phenolic hydroxyl group esterified by an aryl sulfonic acid is the cause for the surprising improvements of the properties of the compounds made according to the present invention. This fact is the more surprising, because just alkoxy groups have become known as very suitable substituents for dyestuffs with an excellent solubility in organic solvents.

In the following table some further compounds are enumerated which can be produced according to the process indicated in the above examples:

| Acid dyestuff No. | Basic dyestuff | Dyeing | Acid dyestuff No. | Basic dyestuff | Dyeing |
|---|---|---|---|---|---|
| 4 | Rhodamine 6G | Yellow-orange. | 9 | Rhodamine B | Bluish-red. |
| 5 | Rhodamine B | Blue-violet. |  | Rhodamine 6G | Yellowish-red. |
| 6 | Rhodamine B | Red-violet. | 10 | Seto-flavine T | Yellow-orange. |
| 7 | Rhodamine B | Bluish-red. | 11 | Rhodamine B | Blue-red. |
|  | Rhodamine 6G | Eosine. | 12 | Rhodamine B | Bluish-red. |
| 8 | Rhodamine 6G | Yellow-red. |  | Rhodamine 6G | Red. |
|  | Rhodamine B | Red. |  | Auramine OO | Red-orange. |
|  | Seto-flavine T (Schultz vol. 2, p. 197). | Yellow-orange. | 13 | Rhodamine B | Red. |
|  |  |  |  | Rhodamine 6G | Yellowish-red. |
|  | Auramine OO | Yellow. |  | Auramine OO | Yellow-brown. | is soluble, in the cold, in alcohol in a quantity of 10% and more. The dyeings are water-fast and of excellent light fastness, a fact which is very surprising, when it is considered that 65–70% of this new compound consists of a basic dyestuff which is not fast in itself.

If the precipitation is effected with rhodamine B (Schultz No. 864), there is also obtained a crystallised brown compound of excellent solubility whose beautiful, pure red colorations show an unobjectionable water fastness and a very good light fastness.

Also auramine OO (Schultz No. 752) produces a precipitation which is soluble in cellulose ester lacquers with a beautiful, yellow color. The light fastness is also excellent.

Example 3

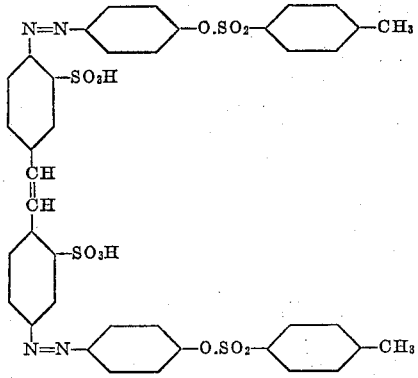

100 parts of this technical dyestuff are dissolved hot in 2000 parts of water and precipitated at 60°–70° C. with a solution of 90 parts of rhodamine B extra in 1500 parts of water and 30 parts of acetic acid 80%. The crystalline compound shows remarkable solubility in alcohol and produces for example in nitrocellulose lacquers pure Here also the other rhodamine dyestuffs still mentioned in Example 1 come equally well into consideration.

*Constitutions of the acid dyestuffs No. 4–13*

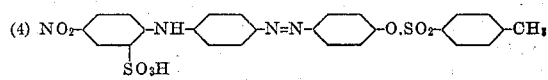

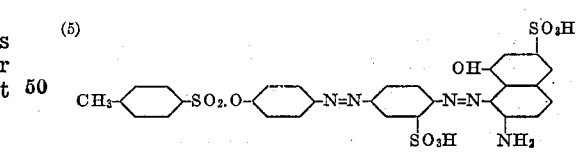

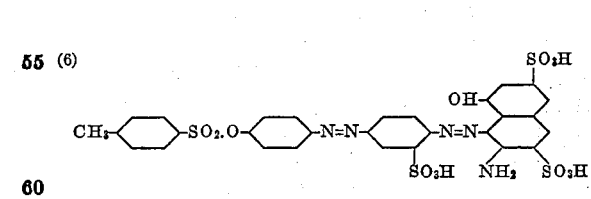

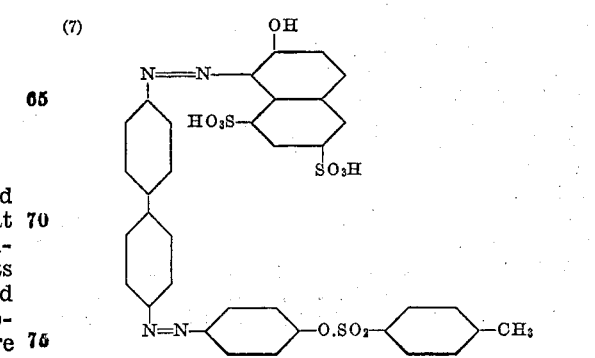

(8) 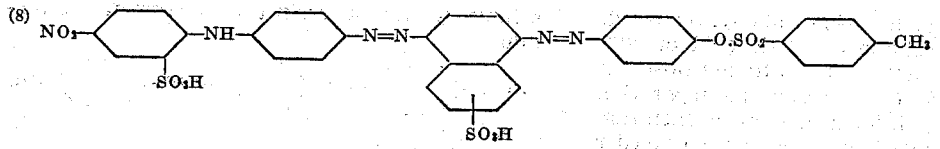

(9) 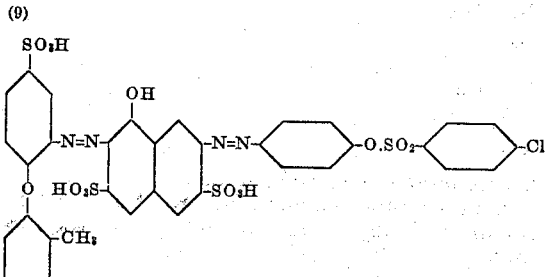

(10) 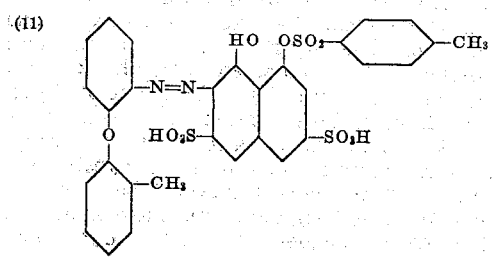

(11) 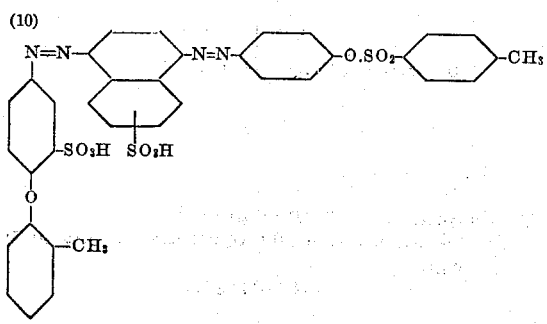

(12) 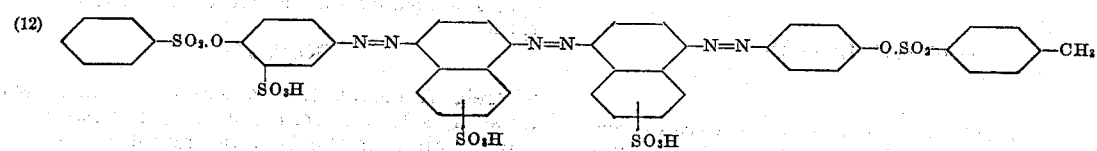

(13) 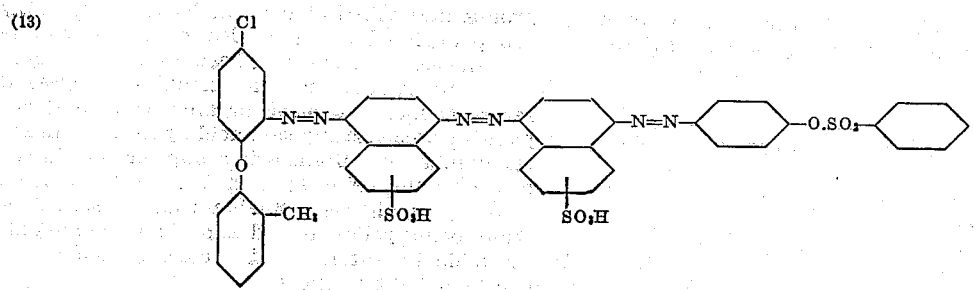

*Example 14*

40 parts of the dyestuff

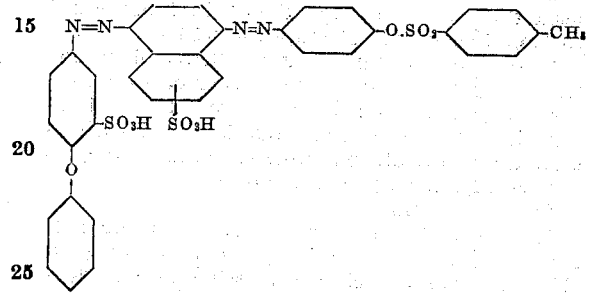

are combined at 50° C., in form of a solution of 4% strength, with a solution of 4% strength of 10 parts of rhodamine 6G extra. Then the whole is allowed to cool down to 30° C. and a solution of 10% strength containing 6 parts of p-toluidine, 6 parts of phenyl biguanide and 12 parts by volume of acetic acid of 80% strength is gradually added thereto. At the end the temperature is again raised to 45° C., whereby the precipitation is converted into a fine powder form. It is finally filtered off and washed. 43 parts of a brown powder are obtained, 10 per cent of which are soluble in alcohol and nitrocellulose lacquers. The shade of the lacquer dyeings is somewhat yellower than that of the corresponding dyestuff which is only prepared from an acid and basic dyestuff, but the light-fastness is just as good.

*Example 15*

9 parts of auramine OOOOO and 1 part of rhodamine 6G extra are dissolved in 250 parts of Instead of the toluene, benzene or chlorobenzene sulfonyl radicals in the above examples, also other sulfonic acid radicals of benzene compounds with neutral substituents (halogen, alkyl, alkoxy groups and the like) may equally well be used; for practical reasons (cheapness) the hydrocarbon sulfonyl radicals are preferred.

water and this solution is slowly added, while thoroughly stirring, at 50° C. to a 4% solution of the acid dyestuff according to Example 14. Then the temperature is allowed to sink to 30° C., whereupon the mixture is gradually treated with 100 parts by volume of a solution containing 5 parts of p-toluidine, 5 parts of phenyl biguanide and 10 parts by volume of acetic acid of 80% strength. It is advantageous to finally raise the temperature to 45° C., whereby the separation form is favourably influenced. After filtration and drying, 40 parts of an orange brown powder are obtained which possesses the same properties as the alcohol-soluble dyestuff according to Example 14.

Instead of the acid and basic dyestuffs used in Examples 14 and 15 there may quite well be used the compounds mentioned in Examples 1 to 3 and in the table, Examples 4 to 13.

Instead of p-toluidine and phenyl biguanide there may quite well be used other bases known for the precipitation of acid dyestuffs, such as for instance diphenyl guanidine, di-o-tolyl guanidine, cyclohexyl phenyl amine, dicyclo hexylamine, dodecyl amine and so on.

What we claim is:

1. Process for the manufacture of alcohol-soluble dyestuffs wherein an acid azo dyestuff selected from the class consisting of azo dyestuffs of the benzene, naphthalene and pyrazolone series and containing at least one hydroxy group acylated by an aryl sulfonic acid of the benzene series, is precipitated with a basic dyestuff selected from the rhodamine and ketonimine dyestuff series.

2. Process for the manufacture of alcohol-soluble dyestuffs wherein an acid azo dyestuff selected from the class consisting of azo dyestuffs of the benzene, naphthalene and pyrazolone series and containing at least one hydroxy group acylated by an aryl-sulfonic acid of the benzene series and more than one sulfonic acid group is precipitated with at least an equimolecular part of a basic dyestuff selected from the rhodamine and ketonimine dyestuff series and with a basic organic compound capable of precipitating said acid dyestuff.

3. Process for the manufacture of alcohol-soluble dyestuffs wherein an acid azo dyestuff selected from the class consisting of azo dyestuffs of the benzene, naphthalene and pyrazolone series and containing at least one (p) $CH_3.C_6H_4.SO_2.O$— group, is precipitated with a basic dyestuff selected from the rhodamine and ketonimine dyestuff series.

4. Process for the manufacture of an alcohol-soluble dyestuff wherein the dyestuff of the formula

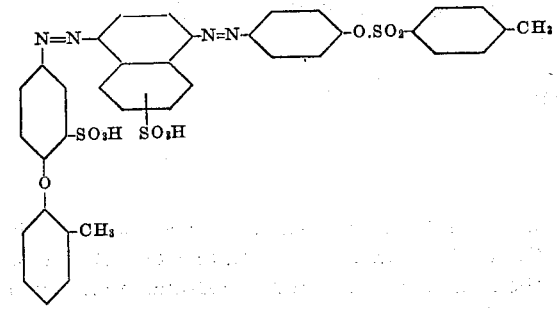

is precipitated with rhodamine 6G.

5. Process for the manufacture of an alcohol-soluble dyestuff wherein the dyestuff of the formula

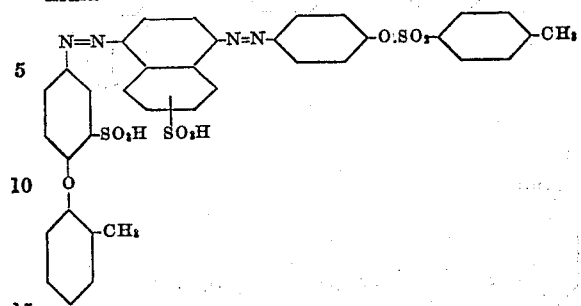

is precipitated with rhodamine B.

6. Process for the manufacture of an alcohol-soluble dyestuff, wherein the dyestuff of the formula

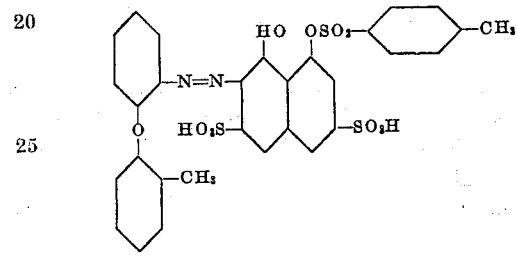

is precipitated with rhodamine B.

7. The alcohol-soluble dyestuffs of the general formula $$A-(SO_3H)_n.B_n$$

wherein A means the radical of an acid azo dyestuff, selected from the class consisting of azo dyestuffs of the benzene, naphthalene and pyrazolone series, connected with the $n$ sulfo groups and substituted by at least one hydroxy group acylated by an arylsufonic acid of the benzene series, B means a basic dyestuff selected from the rhodamine and ketonimine dyestuff series and $n$ means one of 1, 2 and 3, being yellow to red and violet compounds insoluble in water, yielding colored lacquers of excellent light fastness.

8. The alcohol-soluble dyestuffs of the general formula $$A-(SO_3H)_n.B_x.C_{n-x}$$

wherein A means the radical of an acid azo dyestuff, selected from the class consisting of azo dyestuffs of the benzene, naphthalene and pyrazolone series, connected with the $n$ sulfo groups and substituted by at least one hydroxy group acylated by an arylsulfonic acid of the benzene series, B means a basic dyestuff selected from the rhodamine and ketonimine dyestuff series, C means a basic organic compound capable of precipitating said acid dyestuff, $n$ means the number of sulfonic acid groups present in the acid dyestuff, being at least 2, $x$ means at least 1, being in all cases smaller than $n$, said dyestuffs being yellow to red and violet compounds insoluble in water, yielding colored lacquers of excellent light fastness.

9. The alcohol-soluble dyestuffs of the general formula $$(p) CH_3.C_6H_4.SO_2.O.Az(SO_3H)_n.R_n$$

where Az means the radical of an acid azo dyestuff, selected from the class consisting of azo dyestuffs of the benzene, naphthalene and pyrazolone series, connected with the p-toluene sulfonyloxy group and the $n$ sulfo groups, R means the molecule of a rhodamine dyestuff and $n$ means one of 1, 2 and 3, being orange to red and violet compounds insoluble in water, yielding colored lacquers of excellent light fastness.

10. The alcohol-soluble dyestuff of the following formula

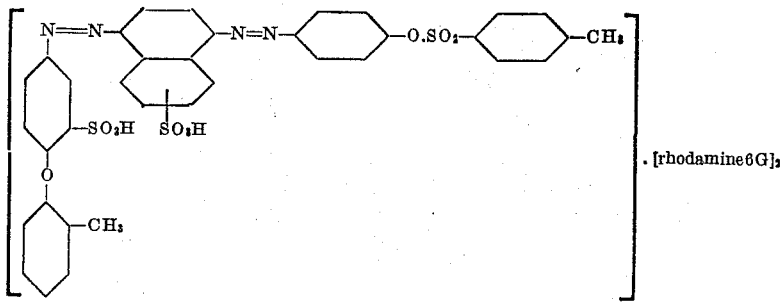

being a brown powder, insoluble in water, yielding colored lacquers of pure orange color of excellent water and light fastness.

11. The alcohol-soluble dyestuff of the following formula

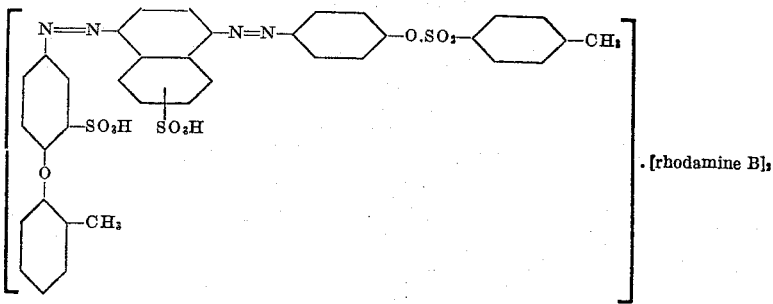

being a brown powder, insoluble in water, yielding colored lacquers of pure red color of excellent water and light fastness.

12. The alcohol-soluble dyestuff of the following formula

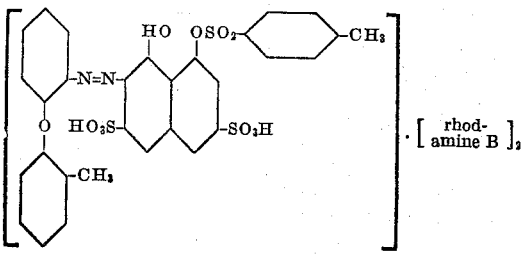

being a dark powder, insoluble in water, yielding colored lacquers of bluish red color of excellent fastness properties.

ACHILLE CONZETTI.
ERNST LEHMANN.